United States Patent
Funk

[19]

[11] Patent Number: 6,009,726
[45] Date of Patent: Jan. 4, 2000

[54] GLASS BENDING PROCESS AND APPARATUS

[75] Inventor: Dieter Funk, Witten, Germany

[73] Assignee: Flachglas Automotive GmbH, Witten, Germany

[21] Appl. No.: 09/059,963

[22] Filed: Apr. 14, 1998

[30] Foreign Application Priority Data

Apr. 16, 1997 [DE] Germany .......................... 197 15 778

[51] Int. Cl.[7] .......................... C03B 23/03; C03B 23/035
[52] U.S. Cl. ................................ 65/106; 65/104; 65/107; 65/273; 65/287; 65/182.2
[58] Field of Search ................................ 65/64, 104, 106, 65/107, 182.2, 273, 287

[56] References Cited

U.S. PATENT DOCUMENTS

| | | | |
|---|---|---|---|
| 3,573,889 | 4/1971 | McMaster et al. | 65/62 |
| 4,632,691 | 12/1986 | Smith et al. | 65/273 |
| 4,738,704 | 4/1988 | Vanaschen et al. | 65/106 |
| 4,746,348 | 5/1988 | Frank | 65/104 |
| 4,778,506 | 10/1988 | Petitcollin et al. | 65/106 |
| 4,828,598 | 5/1989 | Imamura et al. | 65/104 |
| 4,918,946 | 4/1990 | Vanaschen et al. | 65/104 |
| 5,286,271 | 2/1994 | Rueter | 65/106 |
| 5,669,952 | 9/1997 | Claassen et al. | 65/106 |
| 5,713,976 | 2/1998 | Kuster et al. | 65/106 |
| 5,833,729 | 11/1998 | Meunier et al. | 65/106 |

FOREIGN PATENT DOCUMENTS 0 668 249   8/1995   European Pat. Off. .

*Primary Examiner*—Sean Vincent
*Attorney, Agent, or Firm*—Herbert Dubno

[57] ABSTRACT

Process for bending the outer glass pane and the inner glass pane of laminated safety glass panes bend with predefined curvature geometry. The press-bending system incorporates a bending station, a discharge station, as well as between bending station and discharge station, a conveyor shuttle. The glass panes to be bent, heated to bending temperature, are introduced singly into the bending station with the aid of a transfer line and are bent in it, taking account of the predefined curvature geometry of the laminated safety glass panes. The outer glass pane and the inner glass pane are subjected to optimizing bending at a temperature, which is in the lower bending temperature range, in the discharge station assigned to them. To carry out optimizing bending, the glass panes are lifted off the conveyor shuttle with the aid of a take-off device, which take-off device possesses an optimizing contour at least in the edge area. The optimizing bending is carried out by placing the glass panes on the optimizing contour. Also a press-bending system to carry out the process is indicated.

13 Claims, 4 Drawing Sheets

GLASS BENDING PROCESS AND APPARATUS

FIELD OF THE INVENTION

The present invention relates to a process and an apparatus for bending glass and, more particularly, to the bending of outer and inner glass panes to be laminated with a bending film between them into a finished laminated safety glass. More particularly, this invention relates to a press bending system in which, apart from a bending station with at least one bending press, to which the glass panes are fed at a press bending temperature, discharge stations are provided to which the bent glass panes from the glass are fed by conveyer shuttles.

BACKGROUND OF THE INVENTION

The bending of glass panes utilizing at least one bending press can have conveyer shuttles which transfer outer glass panes to an outer glass pane discharge station and inner glass panes to an inner glass pane discharge station, the stations having locating surfaces corresponding to the curvature geometry of the outer and inner glass panes, respectively in the finished laminated safety glass. The laminated safety glass which results is particularly suitable for use as windshields or rear windows of motor vehicles and it will be understood that the glass panes and hence the laminated safety glass formed therefrom will usually have double curvature, i.e. curvature about two mutually perpendicular axes.

Processes for bending inner and outer glass panes to impart a predetermined curvature geometry therefrom and to allow assembly of the bent glass panes into laminated safety glasses are known in a variety of configurations.

Included among them are press bending systems.

In EP 0 668 249 and U.S. Pat. No. 5,286,217, for example, the bent outer glass panes and bent inner glass panes leave the bending station with predetermined curvatures, although the desired optical quality and other considerations may require more precise conformity to predetermined configurations than could be achieved with earlier systems.

In particular, the edge areas of laminated safety glass panes have not generally been satisfactory heretofore.

OBJECTS OF THE INVENTION

The principal object of the present invention is to provide an improved method of bending outer and inner glass panes for the purposes described whereby the drawbacks of earlier systems are avoided.

Another object of the invention is to provide an improved apparatus for carrying out that method.

A specific object of the invention is to provide a method which will greatly improve the accuracy to which the glass panes can be bent to a predetermined curvature geometry and thus whereby the optical quality of the laminated safety glass can be improved.

SUMMARY OF THE INVENTION

These objects can be attained, according to the invention in a method of bending outer and inner glass panes to be laminated with a laminating film between them into a finished laminated safety glass with predetermined curvature geometry.

The method comprises the steps of (a) heating each of the glass panes to a press-bending temperature;

(b) press bending each of the glass panes at the press-bending temperature between male and female molds of a bending press at a bending station;

(c) transferring the glass panes bent in step (b) by at least one conveyor shuttle to at least one discharge station;

(d) lifting each glass pane from the conveyor shuttle at the discharge station with a take-off device having a surface contacting a surface of glass panes lifted by the take-off device at least in an edge region thereof which corresponds to the predetermined curvature geometry of the respective glass pane in the finished laminated safety glass;

(e) subjecting each glass pane lifted by the take-off device to an optimizing bending against the surface of the take-off device and at a bending temperature in a lower part of a bending temperature range; and (f) cooling each glass pane in contact with the surface of the take-off device during optimizing bending of the glass pane to a temperature below a bending temperature of the glass panes.

The apparatus for carrying out this method can comprise:

means for heating glass panes adapted to be formed into outer and inner glass panes of the laminated safety glass to a press-bending temperature;

a bending station receiving heated glass panes at the press-bending temperature and provided with at least one bending press for press bending each of the glass panes at the press-bending temperature between male and female molds to form bent glass panes;

at least one conveyor shuttle receiving the bent glass panes from the press for transferring the bent glass panes to at least one discharge station; and a take-off device at the discharge station for lifting each glass pane from the conveyor shuttle, the take-off device having a surface contacting a surface of glass panes lifted by the take-off device at least in an edge region thereof which corresponds to the predetermined curvature geometry of the respective glass pane in the finished laminated safety glass for subjecting each glass pane lifted by the take-off device to an optimizing bending against the surface of the take-off device and at a bending temperature in a lower part of a bending temperature range while cooling each glass pane in contact with the surface of the take-off device during optimizing bending of the glass pane to a temperature below a bending temperature of the glass panes.

More specifically, the invention teaches a process for bending the outer glass pane and the inner glass pane of laminated safety glass panes bent with predefined curvature geometry, in which in each case an outer glass pane and an inner glass pane are combined by interposing a laminating film, during which process bending takes place in a press-bending system, which press bending system incorporates a bending station, at least one discharge station, as well as a conveyor shuttle between bending station and discharge station, where the glass panes to be bent, heated to bending temperature, are introduced singly with the aid of a transfer line into the bending station are bent in it, taking account of the predefined curvature geometry of the laminated safety glass panes, with the following features.

1.1) the outer glass pane and the inner glass pane are subjected to optimizing bending at a temperature, which is in the lower bending temperature range, in the discharge station assigned to them;

1.2) to carry out optimizing bending, the corresponding glass pane is lifted off the conveyor shuttle with the aid of a take-off device, which take-off device possesses an optimizing contour at least in the edge area, which corresponds to the predefined curvature geometry of the outer glass pane or the inner glass pane in the finished laminated safety glass pane;

1.3) the optimizing bending is carried out by placing the corresponding glass pane on the optimizing contour of the take-off device, where, during the course of the optimizing bending, the glass pane is cooled down to a temperature below the bending temperature. Generally, special cooling measures are not necessary for the glass pane after optimizing bending, because the natural bending temperature loss during optimizing bending is sufficient to set the optimizing bending.

In the embodiment for production of laminated safety glass panes for motor vehicles with glass qualities usual for motor vehicles, the outer glass panes and the inner glass panes are usefully subjected to optimizing bending at a bending temperature in the range of 550 to 580° C. and transferred to the conveyor device at a temperature of below 530° C. Within the scope of features 1.2) and 1.3), the glass panes are placed on the take-off device preferably with the aid of aerostatic and/or aerodynamic forces which are generated by the take-off device. Placing of the glass panes can also be carried out with mechanical devices.

The invention is based on the principle that an optimizing process stage can be integrated readily and without special expense in the process of industrial series production described above. In the outer glass pane discharge station or in the inner glass pane discharge station, optimization or bending can be carried out practically without interfering with the normal process sequence by take-off taking place there being carried out with a take-off device, which permits carrying out of the optimizing place there being carried out with a take-off device, which permits carrying out of the optimizing bending in the manner described. In fact, it is only necessary to adapt the take-off device, which is present anyway, for optimization bending as described. The thermodynamic parameters relative to the bending temperature and the cooling can readily be adjusted. Similar tools to those for optimizing bending within the scope of the invention are known for other purposes in the glass industry (U.S. Pat. No. 5,096,480 and EP 0 216 701.

The process according to the invention permits further simplification of the entire process sequence, that is to say by an outer glass pane and an inner glass pane for the individual laminated safety glass panes being passed on for optimizing bending, where they have been bent in the bending station with the same vacuum plane mold whose mold surfaces correspond at least partly to the curvature surface of the laminating film in the finished laminated safety glass pane, preferably in the central area.

The process according to the invention can be carried out in various press-bending systems. The subject of the invention is a press-bending system for bending the outer glass pane and the inner glass pane of laminated safety glass panes bent with predefined curvature geometry, in which in each case an outer glass pane and an inner glass pane are combined by interposing a laminating film, which press-bending system incorporates a bending station, at least a discharge station, as well as in each case a conveyor shuttle between bending station and discharge station, where the bend glass panes are transferred with their conveyor shuttle to the discharge station, whose locating surface correspond to the curvature geometry of the glass panes in the finished laminated safety glass pane, where for the glass panes a take-off device is provided, which at least in the edge area possesses an optimizing contour which corresponds to the predefined curvature geometry of the outer glass pane or the inner glass pane of the finished laminated safety glass pane, and where the discharge station is equipped with devices with which the glass panes can be placed on the optimizing contour of the take-off device.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
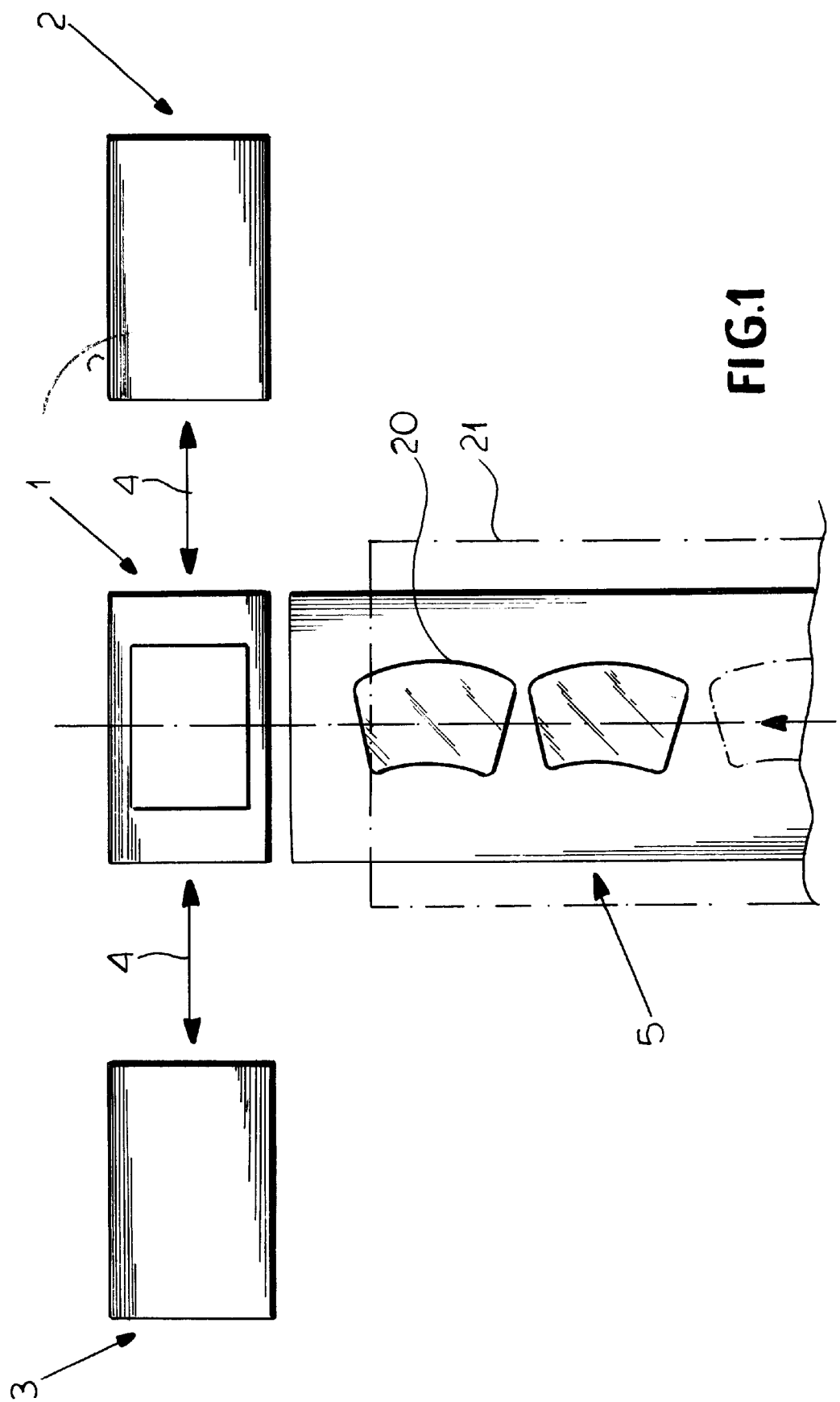
FIG. 1 is a diagrammatic plan view of an apparatus for bending inner and outer glass panes in accordance with the invention.

The press-bending system illustrated in the Figures is used for bending the outer glass pane and the inner glass pane of laminated safety glass panes bent with predefined curvature geometry, in which in each case an outer glass pane and an inner glass pane are combined by interposing a laminating film. The press-bending station comprises inter alia a bending station 1, an outer glass pane discharge station 2, an inner glass pane discharge station 3 and conveyor shuttles 4 which operate between the bending station 1 and the discharge stations 2, 3. The glass panes to be bent, heated to bending temperature, are introduced singly into the bending station 1 with the aid of transfer line 5 and are bent in it, taking into account the curvature geometry of the laminated safety glass pane. The bent outer glass pane is transferred with its conveyor shuttle 4 to the outer glass pane discharge station 2. This conveyor shuttle 4 possesses a locating surface 6 which corresponds to the curvature geometry of the outer glass pane in the finished laminated safety glass pane. The bent inner glass pane is transferred with its conveyor shuttle 4 to the inner glass pane discharge station 3. This conveyor shuttle possesses a locating surface 6 which corresopnds to the curvature geometry of the inner glass pane in the finished laminated safety glass pane. The design of the press-bending system with its T-shaped plan is only one embodiment. The plan can also be L-shaped, that is to say with only one discharge station and two take-off devices which alternatively fulfil the functions already described above and below for the outer glass pane and the inner glass pane.

Figure 2:
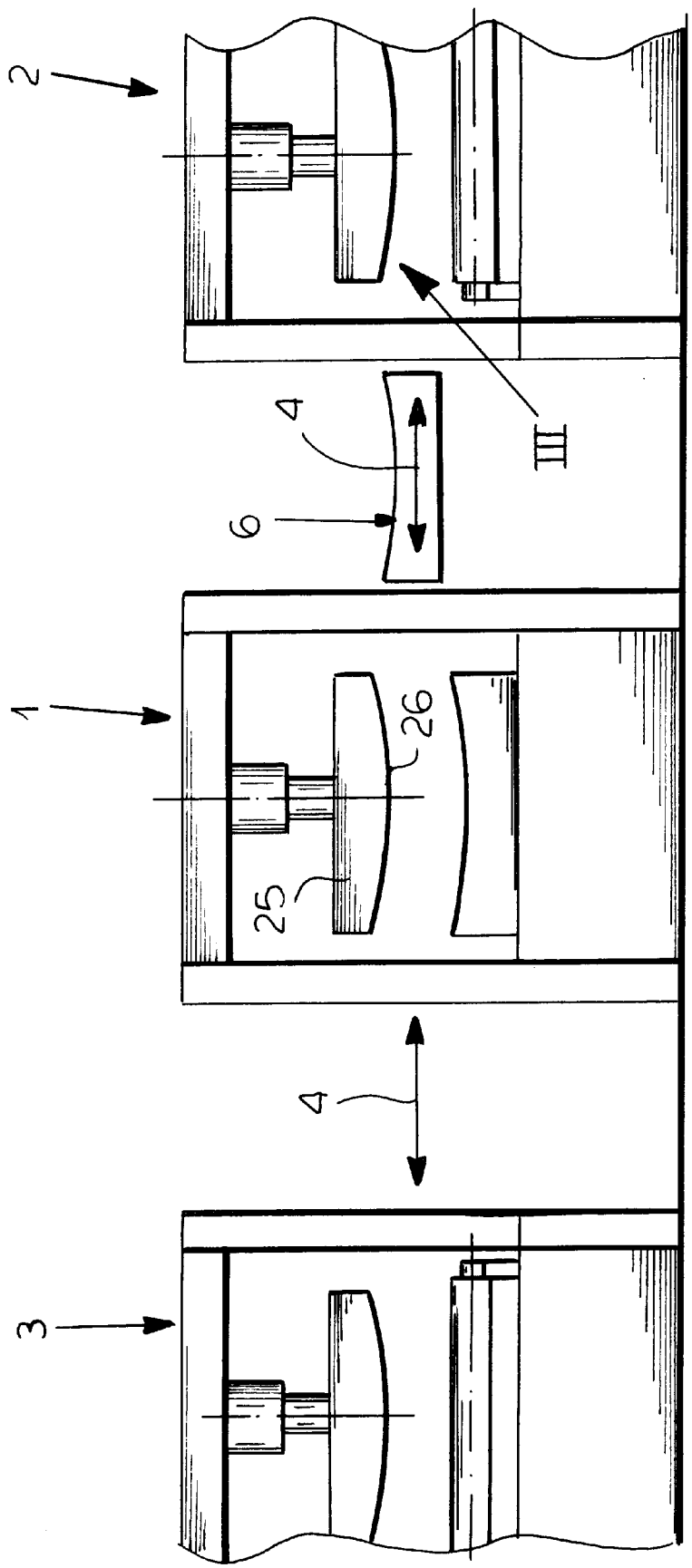
FIG. 2 is an elevational view of bending press and the discharge stations.
Figure 3:
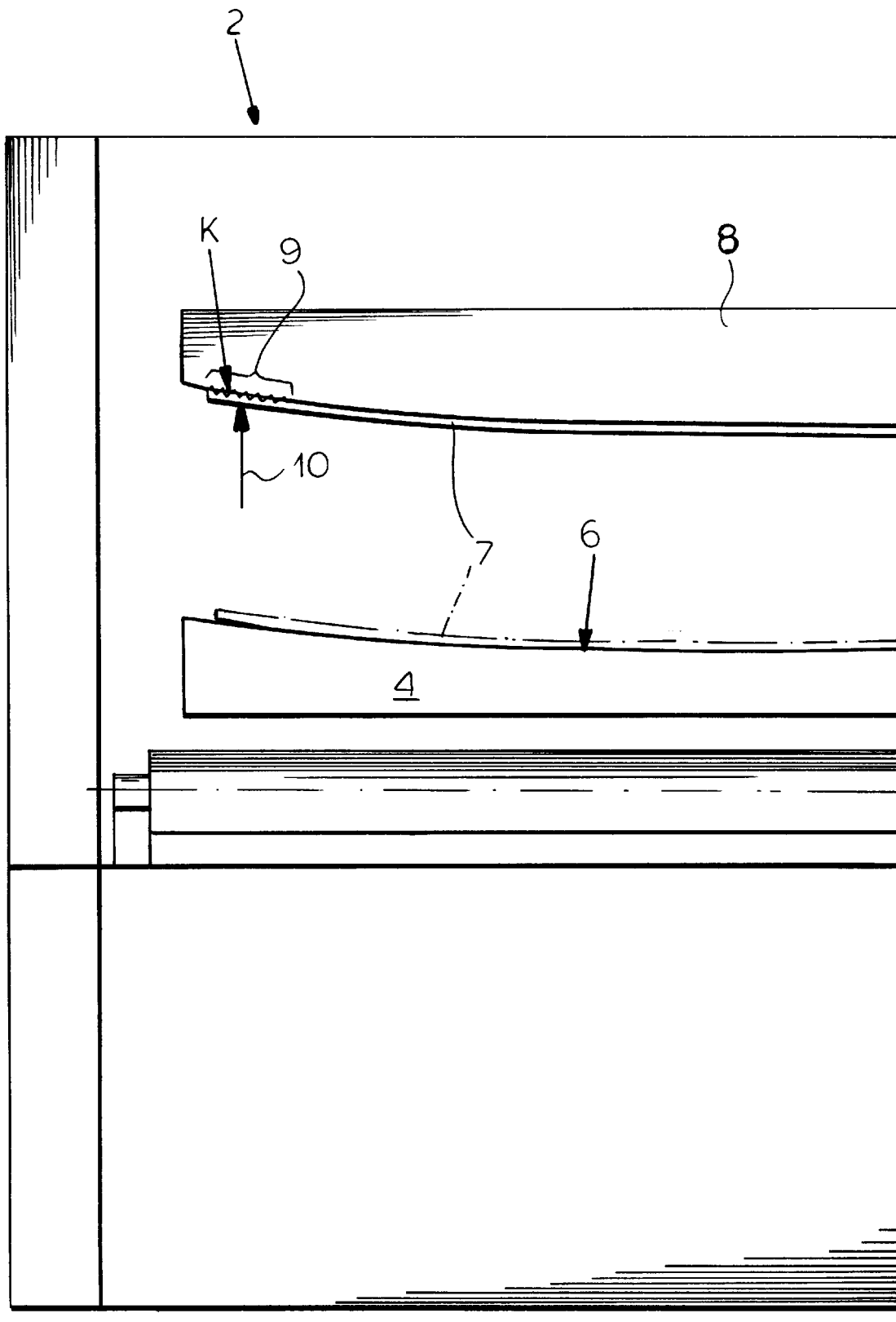
FIG. 3 is a detail of the takeoff device and shuttle structure in the region III of FIG. 2.

According to the invention, the outer glass pane and the inner glass pane are subjected to optimizing bending at a temperature, which is in the bending temperature range, in their corresponding discharge station 2,3. For explanation of the optimizing bending, reference is made to FIGS. 2 and 3. It can be seen that the outer glass pane 7 is lifted off the conveyer shuttle 4 with the aid of a take-off device 8 which possesses a finishing contour 9, at least in the edge area. The optimizing contour 9 corresponds to the predefined curvature geometry K of the outer glass pane 7 in the finished laminated safety glass pane. To carry out optimizing bending, at least the edge area of this outer glass pane 7 is pressed against the optimizing contour 9 in the direction of the arrow 10. This can be effected by means of aerostatic and/or aerodynamic forces which are generated by the take-off device 8. It is also possible to use mechanical devices. The bent inner glass pane is processed accordingly, this also being subjected to optimizing bending, which is not illustrated.

During the course of optimizing bending, the outer glass pane or the inner glass pane cools down to a temperature below the bending temperature range. Subsequently, the panes are passed by the take-off device 8 to a conveyor which leads to further processing. In detail, processing takes place in accordance with Patent claims 1 to 5.

As can be seen from FIG. 1, the glass panes 20 to be formed into the bent glass panes 7 etc. and supplied by the transfer line 5, can pass through a heating furnace 21 in which they are brought to the press-bending temperature.

Figure 4:
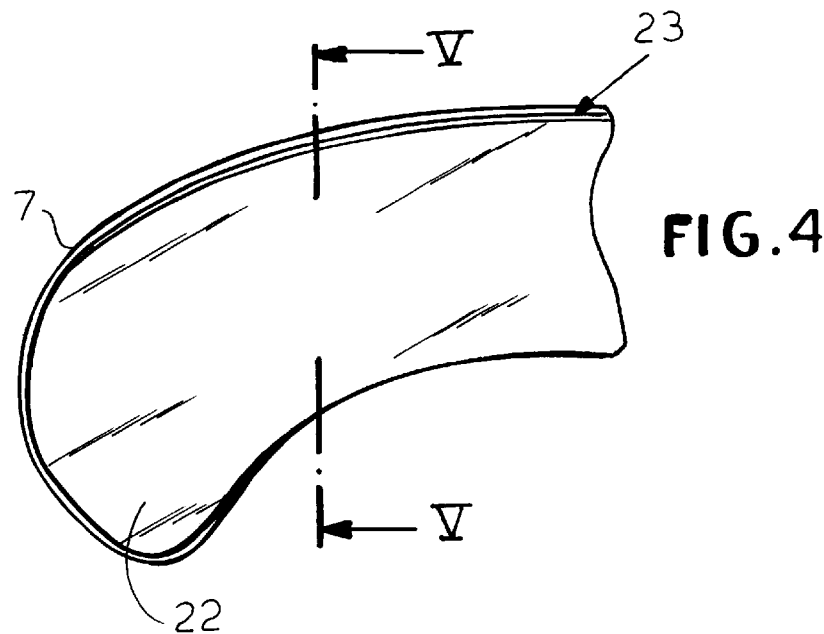
FIG. 4 is a perspective view of a laminated glass formed from the bent glass panes of the invention.
Figures 5, 6:
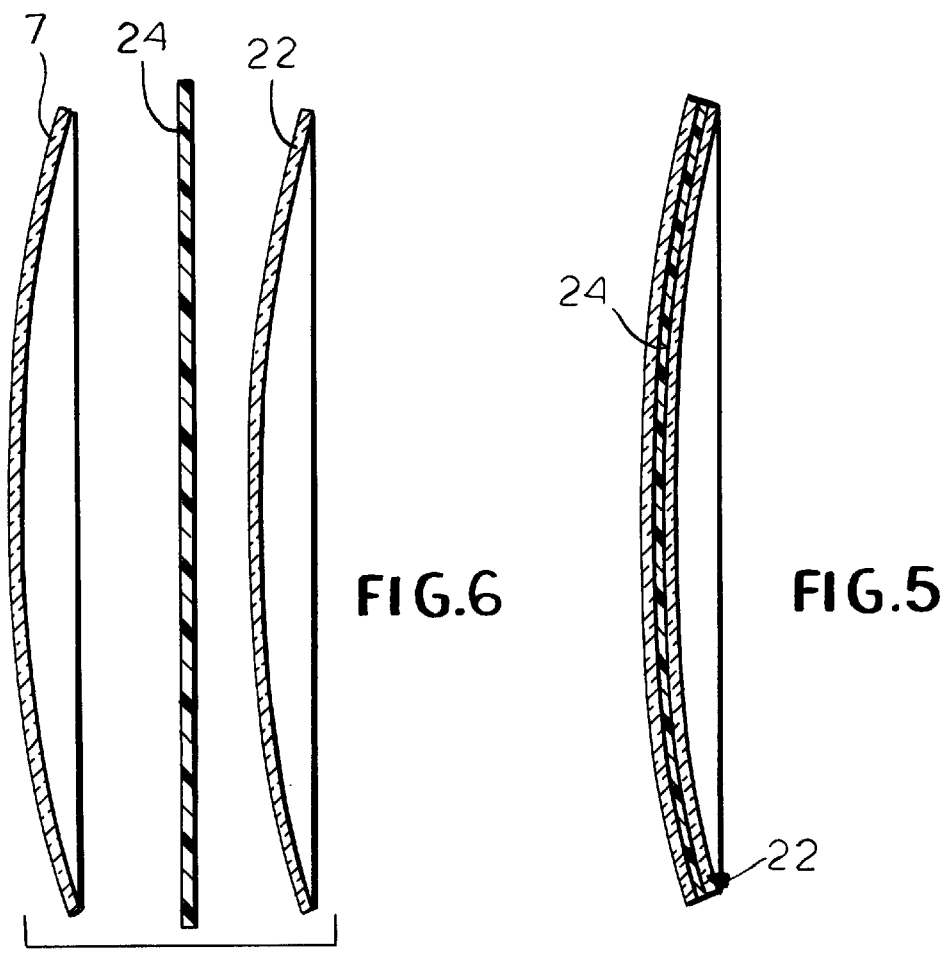
FIG. 5 is a cross sectional view taken along the line V—V of FIG. 4.
FIG. 6 is a cross sectional view of the glass panes prior to lamination.

FIG. 4 shows the laminated glass structure 22 in the form of a doubly curved windshield having the outer glass pane 7 and an inner glass pane 22. The laminating foil prior to be sandwiched in the laminated structure 23, is represented at 24 in FIG. 6 in which the separately bent outer glass pane and the inner glass pane.

That foil 24 (see FIG. 5) has the curvature at least at the central region which is provided on the upper vacuum plane mold 25. That curved region 26 is common to the curvature imparted to both the inner and outer panes (see the commonly assigned copending application (Attorneys docket no. 20693), Ser. No. 09/059,962 and corresponding to german application 19 715 776.9.

I claim:

1. A method of bending outer and inner glass panes to be laminated with a laminating film between them into a finished laminated safety glass with a curvature geometry, said method comprising the steps of:
   (a) heating each of said glass panes to a press-bending temperature;
   (b) press bending each of said glass panes at said press-bending temperature between male and female molds of a bending press at a bending station;
   (c) transferring the glass panes bent in step (b) by at least one conveyor shuttle to at least one discharge station;
   (d) lifting each glass pane from said conveyor shuttle at said discharge station with a take-off device having a surface contacting a surface of glass panes lifted by the take-off device at least in an edge region thereof which corresponds to the curvature geometry of the respective glass pane in the finished laminated safety glass;
   (e) subjecting each glass pane lifted by said take-off device to an optimizing bending against said surface of said take-off device and at a bending temperature in a lower part of a bending temperature range; and
   (f) cooling each glass pane in contact with said surface of said take-off device during optimizing bending of the glass pane to a temperature below a bending temperature of said glass panes.

2. The method defined in claim 1 wherein said glass panes are subjected to optimizing bending in step (e) at a bending temperature in a range of 550° to 580° C. and, after cooling in step (f) are deposited upon a conveyor at a temperature below 530° C.

3. The method defined in claim 1 wherein said glass panes are transferred from said shuttle to said lift-off device by aerostatic or aerodynamic forces.

4. The method defined in claim 1 wherein said glass panes are mechanically transferred from said shuttle to said lift-off device.

5. The method defined in claim 1 wherein said outer and said inner glass panes are subjected to press bending in step (b) with the same vacuum plane mold and said vacuum plane mold has a mold surface corresponding in curvature to a curvature of said film in said finished laminated safety glass, at least in a central region thereof.

6. The method defined in claim 1 wherein, from said bending station, said outer glass panes are transferred by one shuttle to one discharge station wherein said outer glass panes are subjected to said optimizing bending and, from said bending station said inner glass panes are transferred by another shuttle to another discharge station wherein said inner glass panes are subjected to said optimizing bending.

7. The method defined in claim 6 wherein said glass panes are subjected to optimizing bending in step (e) at a bending temperature in a range of 550° to 580° C. and, after cooling in step (f), are deposited upon a conveyor at a temperature below 530° C.

8. The method defined in claim 7 wherein said glass panes are transferred from said shuttles to said lift-off devices by aerostatic or aerodynamic forces.

9. The method defined in claim 7 wherein said glass panes are mechanically transferred from said shuttles to said lift-off devices.

10. The method defined in claim 7 wherein said outer and said inner glass panes are subjected to press bending in step (b) with the same vacuum plane mold and said vacuum plane mold has a mold surface corresponding in curvature to a curvature of said film in said finished laminated safety glass, at least in a central region thereof.

11. An apparatus for bending outer and inner glass panes to be laminated with a laminating film between them into a finished laminated safety glass with a curvature geometry, said apparatus comprising:
   means for heating glass panes adapted to be formed into outer and inner glass panes of said laminated safety glass to a press-bending temperature;
   a bending station receiving heated glass panes at said press-bending temperature and provided with at least one bending press for press bending each of said glass panes at said press-bending temperature between male and female molds to form bent glass panes;
   at least one conveyor shuttle receiving said bent glass panes from said press for transferring the bent glass panes to at least one discharge station; and
   a take-off device at said discharge station for lifting each glass pane from said conveyor shuttle, said take-off device having a surface contacting a surface of glass panes lifted by the take-off device at least in an edge region thereof which corresponds to the curvature geometry of the respective glass pane in the finished laminated safety glass for subjecting each glass pane lifted by said take-off device to an optimizing bending against said surface of said take-off device and at a bending temperature in a lower part of a bending temperature range while cooling each glass pane in contact with said surface of said take-off device during optimizing bending of the glass pane to a temperature below a bending temperature of said glass panes.

12. The apparatus defined in claim 11 wherein said press has a common vacuum plane mold for pressing both said outer and said inner glass panes, said vacuum plane mold having a mold surface corresponding in curvature to a curvature of said film in said finished laminated safety glass, at least in a central region thereof.

13. The apparatus defined in claim 12 wherein a respective discharge station is provided for said outer glass panes and for said inner glass panes and respective conveyor shuttles deliver the respective take-off devices of said discharge stations.

* * * * *